(12) United States Patent
Hiramoto et al.

(10) Patent No.: US 11,891,841 B2
(45) Date of Patent: Feb. 6, 2024

(54) OPENING AND CLOSING DEVICE OF VEHICLE SLIDING DOOR

(71) Applicant: MITSUI KINZOKU ACT CORPORATION, Yokohama (JP)

(72) Inventors: Shigenori Hiramoto, Kanagawa (JP); Naoki Hanaki, Kanagawa (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 114 days.

(21) Appl. No.: 17/143,437

(22) Filed: Jan. 7, 2021

(65) Prior Publication Data

US 2021/0214976 A1  Jul. 15, 2021

(30) Foreign Application Priority Data

Jan. 11, 2020  (JP) ................. 2020-003277

(51) Int. Cl.
*B60J 5/06* (2006.01)
*E05B 81/06* (2014.01)
*E05B 81/16* (2014.01)
*E05B 81/08* (2014.01)
*E05B 79/20* (2014.01)
(Continued)

(52) U.S. Cl.
CPC ................. *E05B 81/16* (2013.01); *B60J 5/06* (2013.01); *E05B 81/06* (2013.01); *E05B 81/08* (2013.01); *E05B 79/20* (2013.01); *E05B 85/243* (2013.01); *E05B 85/26* (2013.01)

(58) Field of Classification Search
CPC .......... E05B 81/16; E05B 81/06; E05B 81/18; E05B 79/20; E05B 85/243; E05B 85/26; E05B 77/265; E05B 81/20; E05B 83/40; B60J 5/06; E05C 17/60
See application file for complete search history.

(56) References Cited

U.S. PATENT DOCUMENTS 9,163,434 B2 * 10/2015 Uehara ................. E05B 77/265
10,697,210 B2 * 6/2020 Hiramoto ................ E05B 81/90
(Continued)

FOREIGN PATENT DOCUMENTS

JP  2005-138696 A  6/2005
JP  2014-009477 A  1/2014
(Continued)

*Primary Examiner* — Kristina R Fulton
*Assistant Examiner* — Thomas L Neubauer
(74) *Attorney, Agent, or Firm* — Foley & Lardner LLP

(57) ABSTRACT

An opening and closing device of a vehicle sliding door includes: a fully closed latch mechanism; a fully opened latch mechanism; a power releaser; a power closer; a canceler; a lock mechanism; and a relay control mechanism that includes an inner handle. The lock mechanism, the power releaser, and the canceler are disposed in the fully closed latch mechanism. The relay control mechanism includes a handle lever configured to, when a door opening operation is performed on the inner handle, rotate in a first direction to unlatch the fully closed latch mechanism and activate the cancel mechanism, and when a door closing operation is performed on the inner handle, rotate in a second direction to unlatch the fully opened latch mechanism. The inner handle is pivotally supported by the handle case of the relay control mechanism so as to be rotatable in two directions.

7 Claims, 13 Drawing Sheets

(51) Int. Cl.
*E05B 85/24* (2014.01)
*E05B 85/26* (2014.01)

(56) References Cited

U.S. PATENT DOCUMENTS

| | | |
|---|---|---|
| 11,414,898 B2 * | 8/2022 | Okuyama ................ E05B 81/20 |
| 2005/0099017 A1 | 5/2005 | Yoeyama et al. |
| 2019/0003213 A1 | 1/2019 | Yokomori et al. |
| 2019/0284849 A1 * | 9/2019 | Ilea ........................ E05B 81/54 |
| 2020/0248486 A1 * | 8/2020 | Okuyama ................ E05B 79/08 |

FOREIGN PATENT DOCUMENTS

| | | |
|---|---|---|
| JP | 2014-152496 A | 8/2014 |
| JP | 2016-094770 A | 5/2016 |
| JP | 2018-058520 A | 4/2018 |
| WO | WO 2017/109852 A1 | 6/2017 |

* cited by examiner

OPENING AND CLOSING DEVICE OF VEHICLE SLIDING DOOR

CROSS-REFERENCE TO RELATED APPLICATION(S)

The present application claims priority to and incorporates by reference the entire contents of Japanese Patent Application No. 2020-003277 filed in Japan on Jan. 11, 2020.

BACKGROUND

1. Technical Field

The present disclosure relates to an opening and closing device of a vehicle sliding door.

2. Related Art

In the related art, an opening and closing device of a vehicle sliding door includes a power closer, a power releaser, and a power lock actuator. The power closer acts on a fully closed latch mechanism to move the sliding door from a half-latched state to a fully latched state. The power releaser acts on a fully closed latch mechanism to release the sliding door from a closed state, and acts on a door opening latch mechanism to release the sliding door from an opened state. The power lock actuator acts on a lock mechanism to switch the lock mechanism between a locked state and an unlocked state.

The power closer, the power releaser, and the power lock actuator include a large-sized motor, a middle-sized motor, and a small-sized motor, respectively, depending on differences in output to be required. The weights and costs of the motors are increased in proportion to those size.

For example, the power (output) from the power closer and the power releaser is transmitted to a member to be operated such as a latch and a ratchet of a latch mechanism via a transmission mechanism such as a Bowden cable. The latch mechanism of the sliding door includes a fully closed latch mechanism and a fully opened latch mechanism. Thus, the total length of the cable to be installed will be very long. Consequently, the total weight of a wire and the total weight of the motor are the main cause of increasing the weight of the opening and closing device of the vehicle sliding door.

Moreover, an outer handle and an inner handle are provided on the sliding door. The operation force applied to the outer handle and the inner handle is transmitted to the member to be operated via a transmission mechanism such as a cable. The weight of the opening and closing device of the vehicle sliding door is also increased due to the above factor.

For example, Japanese Laid-open Patent Publication No. 2005-138696 discloses a configuration in which a power closer is provided on a fully closed latch mechanism, a power releaser is provided on a first relay control mechanism located near the center of the sliding door, and a power lock actuator is provided on a second relay control mechanism located near the center of the sliding door. Moreover, Japanese Laid-open Patent Publication No. 2014-009477, Japanese Laid-open Patent Publication No. 2014-152496, and Japanese Laid-open Patent Publication No. 2016-094770 each disclose a configuration in which the motors of the power closer and the power releaser are combined into a single common motor. The advantage of this configuration is that a motor is commonly used. However, the total length of the cable is increased by arranging a plurality of cables in a complicated manner, and the total length of the cables is also increased by using a pair of reciprocating cables. Consequently, it is considered that the total weight of the motor and cables becomes heavier than, that in Japanese Laid-open Patent Publication No. 2005-138696, and the assembly becomes more complicated.

Moreover, Japanese Laid-open Patent Publication No. 2018-058520 discloses an opening and closing device of a vehicle sliding door the weight of which is reduced by providing a touch sensor and the like on the outer handle and the inner handle, and by electrically coupling (by-wire) a part of the opening and closing device instead of mechanical coupling through the cable.

Furthermore, WO 2017/109852 discloses a configuration in which two power supplies are used so that when power from the main battery of the vehicle is not supplied to the power lock actuator due to a vehicle accident and the like, the power lock actuator can be driven by an auxiliary battery.

As described above, the weight reduction of the opening and closing device of the vehicle sliding door has been attempted by commonly using the motor of the power closer, the power releaser, and the power lock actuator; by improving the arrangement of the cables used for transmitting the output of the motor to the member to be operated, by improving the arrangement of the cables used for transmitting the operation force of the outer handle and the inner handle to the member to be operated, and the like. However, it has not been successful in reducing the weight and also in simplifying the configuration.

It is desirable to simplify the relay control mechanism and reduce the weight of an opening and closing device of a vehicle sliding door.

SUMMARY

In some embodiments, an opening and closing device of a vehicle sliding door includes: a fully closed latch mechanism configured to maintain a sliding door in a closed state in cooperation with a striker; a fully opened latch mechanism configured to maintain the sliding door in an opened state in cooperation with a fully opened striker; a power releaser configured to unlatch the fully closed latch mechanism and the fully opened latch mechanism by motor power; a power closer configured to move a latch of the fully closed latch mechanism from a half-latched position to a fully latched position via a power transmission path by motor power; a canceler configured to cancel movement of the latch toward the fully latched position by the motor power, by blocking the power transmission path; a lock mechanism configured to switch between an unlocked state and a locked state by motor power, the unlocked state being a state where the fully closed latch mechanism can be unlatched by operating the power releaser, the locked state being a state where the fully closed latch mechanism cannot be unlatched by operating the power releaser; and a relay control mechanism that includes an inner handle. The lock mechanism, the power releaser, and the canceler are disposed in the fully closed latch mechanism, the relay control mechanism includes a handle lever configured to, when a door opening operation is performed on the inner handle, rotate in a first direction to unlatch the fully closed latch mechanism and activate the cancel mechanism, and when a door closing operation is performed on the inner handle, rotate in a second direction to unlatch the fully opened latch mechanism, the inner handle is pivotally supported by the handle case of the relay control mechanism so as to be rotatable in two directions, and the handle lever is pivotally supported by the handle case.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Preferred embodiments of an opening and closing device of a vehicle sliding door according to the disclosure will be described in detail with reference to the accompanying drawings. The opening and closing device of the disclosure includes a fully closed latch mechanism that maintains a sliding door in a closed state, a fully opened latch mechanism that keeps the sliding door in an opened state, a releasing mechanism that releases the sliding door from the closed state, a releasing mechanism that releases the sliding door from the opened state, a lock mechanism that restricts the function of the releasing mechanism, and the like.

Figure 1:
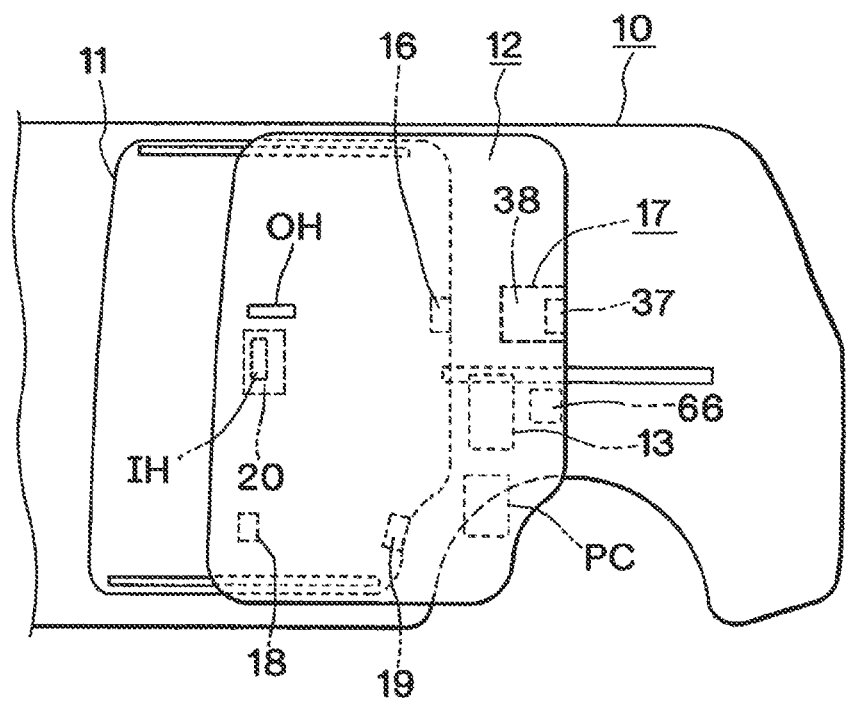
FIG. 1 is a schematic side view of a vehicle body and a sliding door provided with an opening and closing device of a vehicle sliding door according to the disclosure.
Figure 2:
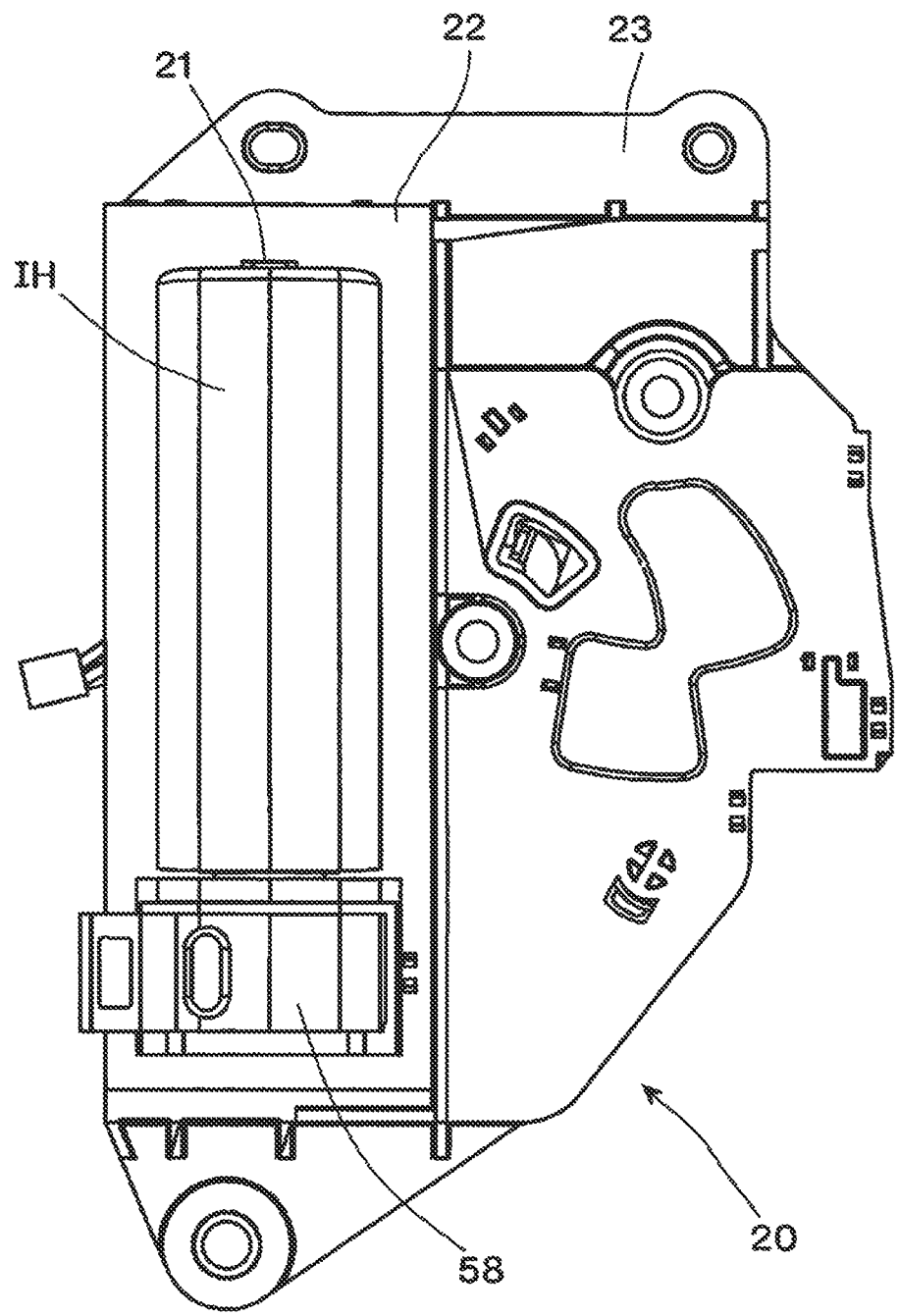
FIG. 2 is an interior side view of a relay control mechanism in the opening and closing device of the vehicle sliding door.

FIG. 1 illustrates a side surface of a vehicle provided with an opening and closing device. The vehicle includes a vehicle body 10, a door opening part 11 of the vehicle body 10, and a sliding door 12 slidably attached to the vehicle body 10. The sliding door 12 slides in a door closing direction that is a direction toward the front and in a door opening direction that is a direction toward the rear by the power of a power sliding mechanism 13 disposed on the vehicle body 10 or the sliding door 12.

A striker 16 is provided on the rear edge part of the door opening part 11 of the vehicle body 10. A fully closed latch mechanism 17 (hereinafter, may be abbreviated as a latch mechanism 17) that maintains the sliding door 12 in the closed state by engaging with the striker 16, is provided on the rear end of the sliding door 12. As is well known, the fully closed latch mechanism 17 includes a latch and a ratchet.

Moreover, as illustrated in FIG. 1, the sliding door 12 includes a fully opened latch mechanism 18 provided with a known latch and ratchet mechanism. When the sliding door 12 moves to a predetermined fully opened position by sliding in the opening direction, the fully opened latch mechanism 18 maintains the sliding door 12 at the fully opened position, by engaging with a fully opened striker 19 attached to the vehicle body 10.

An outer handle OH is provided on the exterior surface of the sliding door 12. An inner handle IH is provided on the interior surface of the sliding door 12. An operation force applied to the outer handle OH and the inner handle IH is transmitted to the fully closed latch mechanism 17 and the fully opened latch mechanism 18 via a mechanical coupling means (a Bowden cable and the like).

The inner handle IH is a handle grip that can be operated in two directions of a door opening operation direction and a door closing operation direction. The door opening operation direction is a direction in which the sliding door 12 can be opened by unlatching the fully closed latch mechanism 17. The door closing operation direction is a direction in which the sliding door 12 can be closed by unlatching the fully opened latch mechanism 18. It is preferable that the inner handle IH is pivotally supported by a vertical rotary shaft, and is rotated in the door opening operation direction that is a direction toward the rear of the vehicle from the neutral position, and in the door closing operation direction that is a direction toward the front of the vehicle from the neutral position.

The outer handle OH is a handle grip that can be operated in a single direction. When the outer handle OH is operated, the two latch mechanisms 17 and 18 will be unlatched. The outer handle OH may also be a grip that includes an electrical switch such as a touch sensor and that does not rotate. In this case, the latch mechanisms 17 and 18 are unlatched by electrical coupling (by-wire) instead of mechanical coupling. With the disclosure, a configuration in which the outer handle OH is mechanically coupled and a configuration in which the outer handle OH is electrically coupled can be changed very easily. This point will be explained in the further description of the embodiment.

Relay Control Mechanism 20

A relay control mechanism 20 referred to as a remote controller in the industry is disposed in the internal space of the sliding door 12. The relay control mechanism 20 is characterized by including a function of pivotally supporting the inner handle 18 in a rotatable manner, a function of transmitting the door opening operation force applied to the inner handle IH to the fully closed latch mechanism 17 via a cable, and a function of transmitting the door closing operation force applied to the inner handle IH to the fully opened latch mechanism 18 via a cable. The relay control mechanism 20 is further characterized by transmitting the operation force from the outer handle OH to the relay control mechanism 20 via the fully closed latch mechanism 17. Consequently, regardless of whether the outer handle OH is a rotating handle grip or a non-rotating sensor grip, there is no need to change the design of the coupling mechanism from the fully closed latch mechanism 17 to the relay control mechanism 20 (only needs to change the coupling mechanism from the cuter handle OH to the fully closed latch mechanism 17). Moreover, the relay control mechanism 20 is characterized by not including a motor. Consequently, it is possible to omit the cable used for transmitting the motor power to the fully closed latch mechanism 17 and the fully opened latch mechanism 18.

In consideration of user operability, the inner handle IH is provided at the front side of the sliding door 12 and in a substantially center part in the vertical direction. The relay control mechanism 20 is arranged according to the position of the inner handle IH. The inner handle IH is pivotally supported by a vertical rotary shaft 21 in a handle case 22. The handle case 22 is attached to a base panel 23 by a plurality of screws 24. The base panel 23 is attached to an inner panel (not illustrated) of the sliding door 12.

The inner handle IH is maintained at the neutral position by a neutral spring 25. The inner handle IH is rotated in the door opening operation direction that is a direction from the neutral position toward the rear of the vehicle, and in the door closing operation direction that is a direction from the neutral position toward the front of the vehicle.

Figure 3:
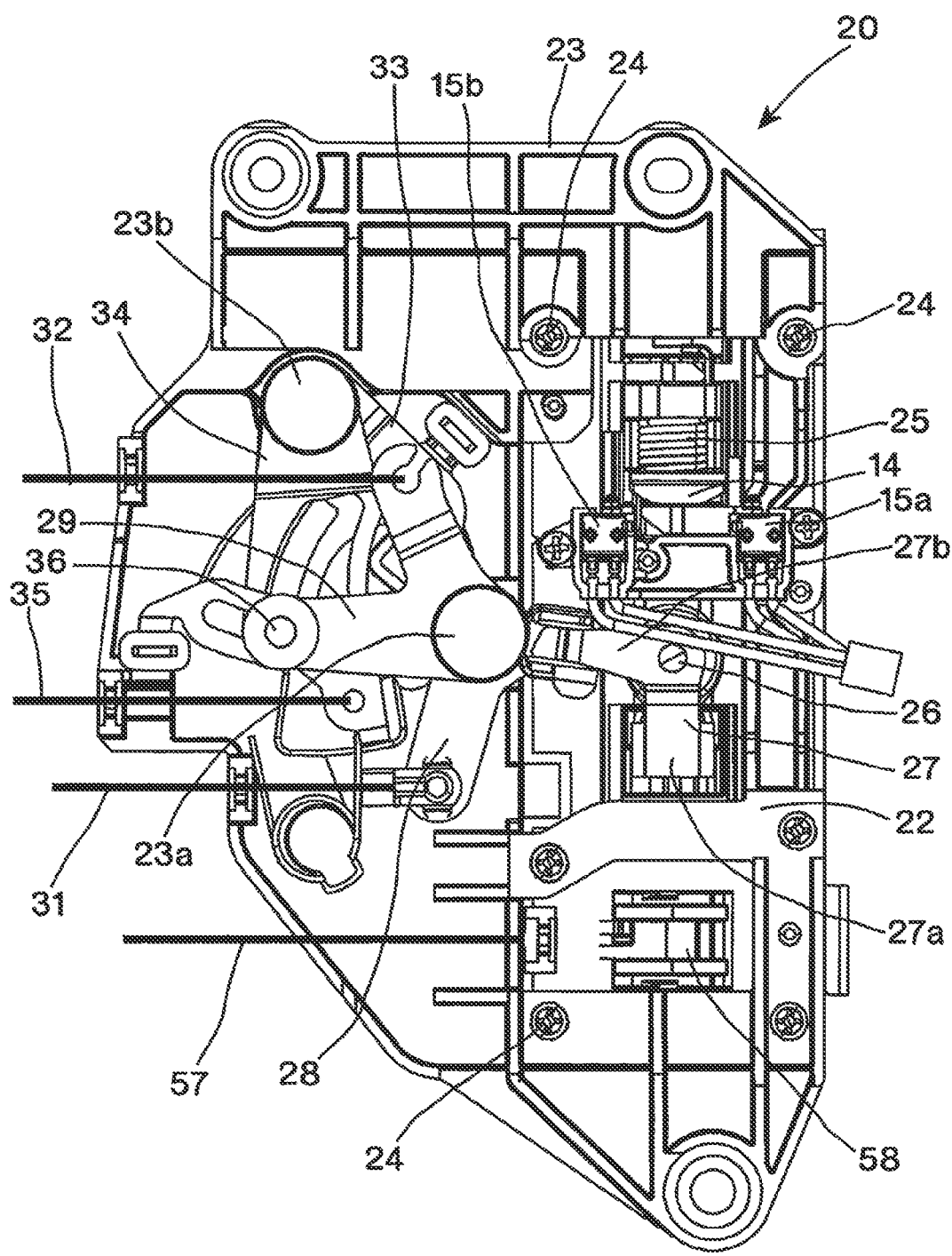
FIG. 3 is an exterior side view of the relay control mechanism in the opening and closing device of the vehicle sliding door.
Figure 4:
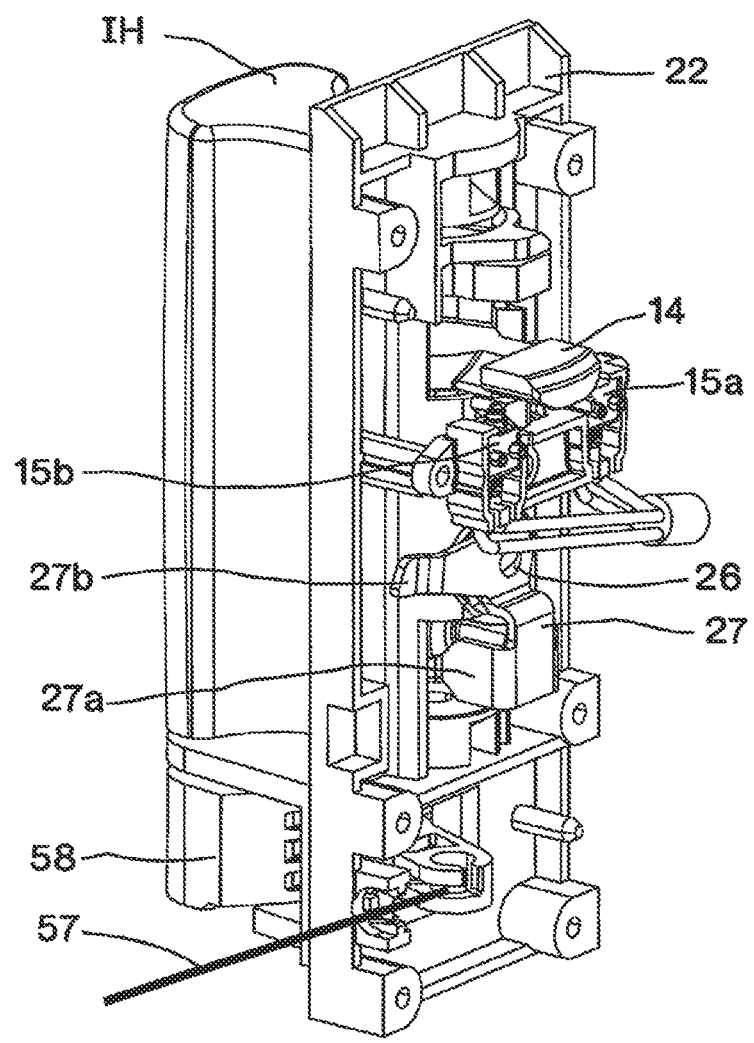
FIG. 4 is a perspective view of a handle case and an inner handle of the relay control mechanism.
Figure 5:
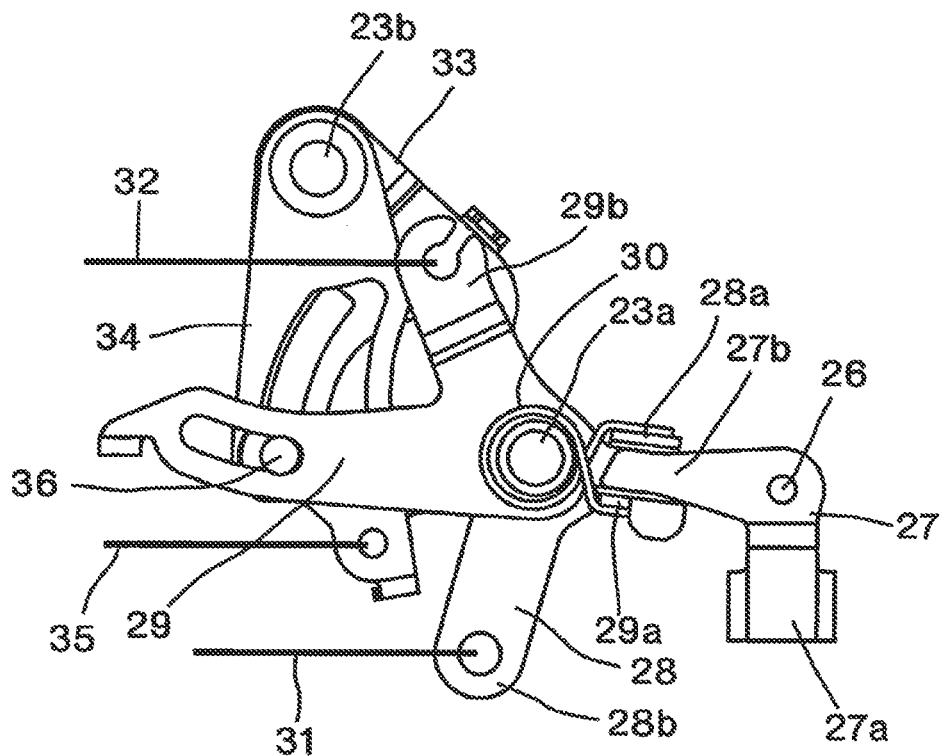
FIG. 5 is a side view illustrating a group of levers of the relay control mechanism.
Figure 6:
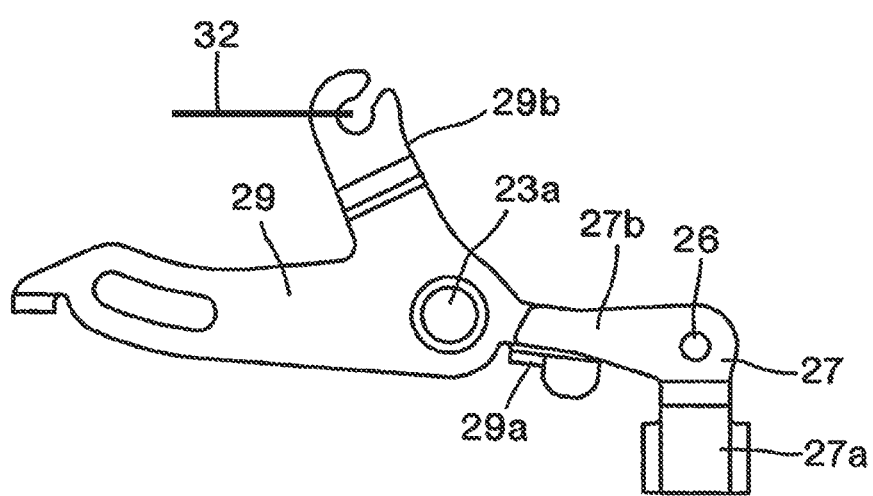
FIG. 6 is a side view of a handle lever and an inner relay lever of the relay control mechanism.

A handle lever 27 is pivotally supported by a pin 26 in the handle case 22. A fork-shaped coupling part 27a is provided on the handle lever 27, and the coupling part 27a is coupled so as to be fitted into a rotating end part of the inner handle IH. When the inner handle IH is rotated in the door opening operation direction or in the door closing operation direction, the handle lever 27 is rotated in the door opening operation direction (counterclockwise direction in FIGS. 3 and 5) or in the door closing operation direction (clockwise direction in FIGS. 3 and 5) around the pin 26.

The handle lever 27 is formed in an L-shape, and includes a handle arm 27b extending from the pin 26 toward the side. A shaft part 23a integrally formed with the base panel 23 is provided on the extension of the handle arm 27b. A fully opened releasing lever 28 and an inner relay lever 29 are pivotally supported by the shaft part 23a. The axis of the shaft part 23a is in parallel with the axis of the pin 26.

The fully opened releasing lever 28 includes an engagement piece 28a that faces the upper edge of the handle arm 27b in an engageable manner. The inner relay lever 29 includes an engagement piece 29a that faces the lower edge of the handle arm 27b in an engageable manner. The engagement piece 28a and the engagement piece 29a are energized by a spring 30 with the handle arm 27b interposed therebetween.

An arm 28b of the fully opened releasing lever 28 is mechanically coupled to the fully opened latch mechanism 18 via a cable 31. When the handle lever 27 is rotated in clockwise direction in FIGS. 3 and 5 by performing a door closing operation the inner handle the handle arm 27b moves the engagement piece 28a upward to rotate the fully opened releasing lever 28 in the counterclockwise direction. When the fully opened releasing lever 28 is rotated in the counterclockwise direction, the fully opened latch mechanism 18 is unlatched via the cable 31 to put the sliding door 12 into a door closable state where the sliding door 12 can be closed.

A coupling arm 29b that extends diagonally upward in the inner relay lever 29 is coupled to a releasing mechanism (details will be described below) of the fully closed latch mechanism 17 via a cable 32. When the handle lever 27 is rotated in the counterclockwise direction in FIGS. 3 and 5 by performing a door opening operation on the inner handle the handle arm 27b moves the engagement piece 29a downward to rotate the inner relay lever 29 in the clockwise direction. When the inner relay lever 29 rotated in the clockwise direction, the fully closed latch mechanism 17 is unlatched via the cable 32 to put the sliding door 12 into a door openable state where the sliding door 12 can be opened.

In this manner, the door closing operation performed on the inner handle IH is transmitted to the fully opened latch mechanism 18 via the relay control mechanism 20, and the door opening operation performed on the inner handle IH is transmitted to the releasing mechanism of the fully closed latch mechanism 17 via the relay control mechanism 20.

The inner handle IH includes a switch arm 14 protruding to the exterior side. The handle case 22 includes a door opening switch 15a and a door closing switch 15b. The door opening switch 15a detects a door opening operation by coming into contact with the switch arm 14 when the door opening operation is performed on the inner handle IH. The door closing switch 15b detects a door closing operation by coming into contact with the switch arm 14 when the door closing operation is performed on the inner handle IH.

Figure 7:
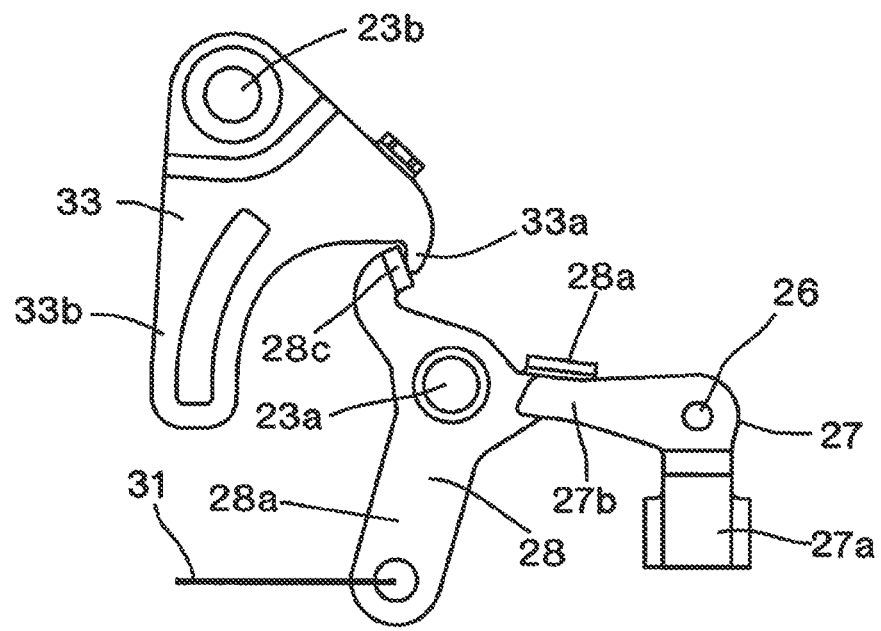
FIG. 7 is a side view of a fully opened releasing lever, a fully opened relay lever, and the handle lever of the relay control mechanism.
Figure 8:
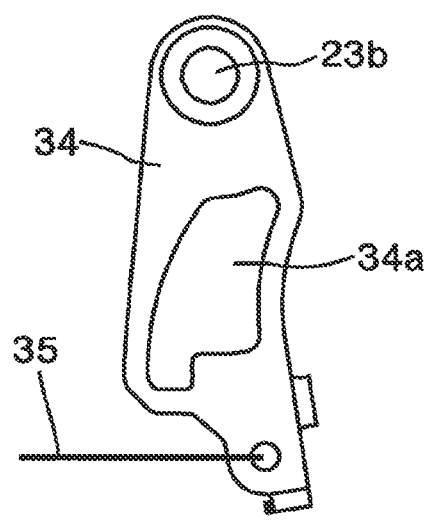
FIG. 8 is a side view of an outer relay lever of the relay control mechanism.

A fully opened relay lever 33 and an outer relay lever 34 are pivotally supported by a shaft part 23b integrally formed with the base panel 23. The axis of the shaft part 23b is in parallel with the axis of the shaft part 23a. As illustrated in FIG. 7, the fully opened relay lever 33 includes a convex part 33a capable of engaging with an engagement part 28c of the fully opened releasing lever 28.

The outer relay lever 34 is coupled to the releasing mechanism of the fully closed latch mechanism 17 via a cable 35. When the releasing mechanism performs a releasing operation by the outer handle OH and the like, the outer relay lever 34 is rotated in the clockwise direction in FIGS. 3 and 5. When the rotation of the outer relay lever 34 in the clockwise direction is transmitted to an arm 33b of the fully opened relay lever 33 via a coupling pin 36, the fully opened relay lever 33 makes the fully opened releasing lever 28 rotate in the counterclockwise direction via the convex part 33a. When the fully opened releasing lever 28 is rotated in the counterclockwise direction, the fully opened latch mechanism 18 is unlatched via the cable 31 to put the sliding door 12 into the door closable state.

In this manner, the operation of the outer handle OH is transmitted to the relay control mechanism 20 via the fully closed latch mechanism 17 to unlatch the fully opened latch mechanism 18.

A large opening 34a formed in the outer relay lever 34 is an opening for preventing mechanical lock from occurring when the inner handle IH, the outer handle OH, and the like are operated at the same time.

Fully-Closed Latch Mechanism 17

The fully closed latch mechanism 17 includes a latch unit 37 meshed with the striker 16, and an operation unit 38. Roughly speaking, the latch unit 37 is in parallel with a width direction of the sliding door 12, and the operation unit 38 extends from the end part of the interior side of the latch unit 37 toward the front of the sliding door 12. The overhead view of the entire fully closed latch mechanism 17 is in an L-shape.

Latch Unit 37

Figure 9:
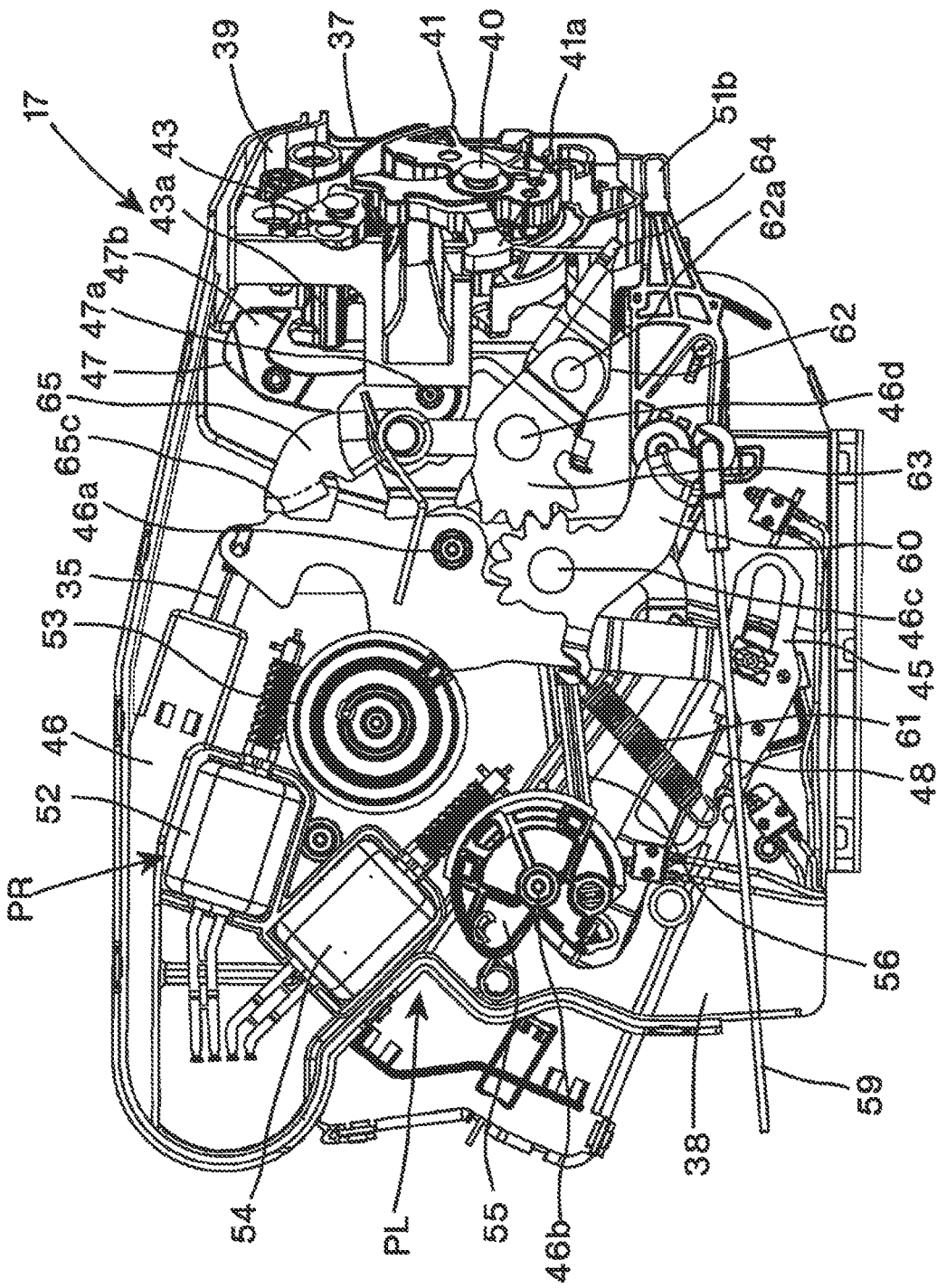
FIG. 9 is a side view illustrating an internal structure of the interior side of a fully closed latch mechanism in the opening and closing device of the vehicle sliding door.
Figure 11:
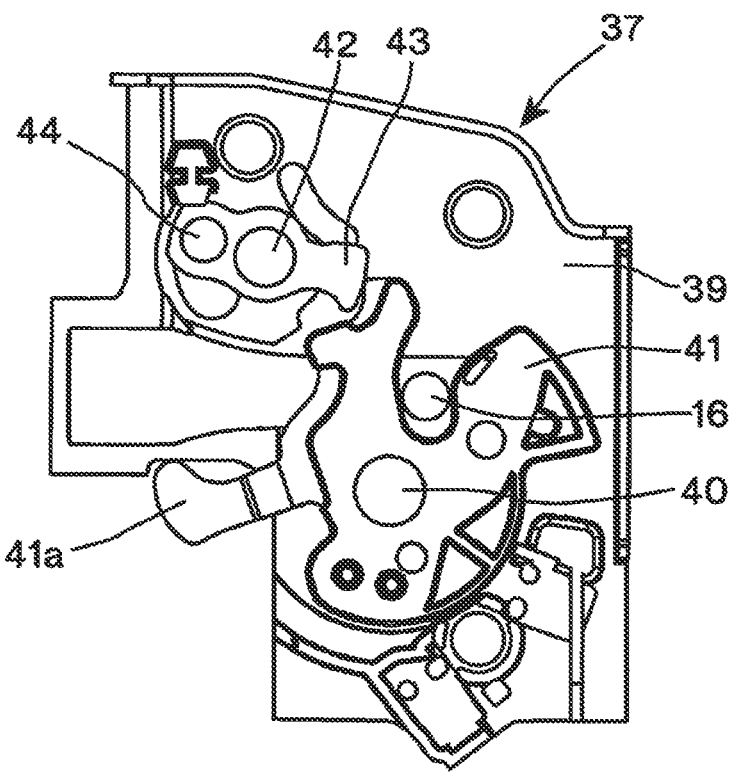
FIG. 11 is a front view of a latch unit of the fully closed latch mechanism.

As illustrated in FIGS. 9 and 11, the latch unit 37 includes a latch body 39 formed of synthetic resin and the like. A latch 41 is pivotally supported by a latch shaft 40 in the latch body 39, and a ratchet 43 is pivotally supported by a ratchet shaft 42 in the latch body 39. When the sliding door 12 is moved in the door closing direction, the latch 41 at the unlatched position comes into contact with the striker 16 of the vehicle body 10, and is rotated to a fully latched position (to be precise, an overstroke position) through a half-latched position. As is well known, by engaging with the latch 41, the ratchet 43 maintains an engaged state between the latch 41 and the striker 16 to maintain the sliding door 12 in the closed state. The latch 41 in FIG. 11 is in the fully latched position and is energized in the counterclockwise rotation direction (unlatch direction) by a latch spring (not illustrated). The ratchet 43 in FIG. 11 is energized in the clockwise rotation direction (latch engaging direction) by a ratchet spring (not illustrated) to be engaged with the latch 41.

A latch arm 41a protruding largely to the operation unit 38 side is provided on the outer peripheral surface of the latch 41. By the motor power of a power closer, which will be described below, the latch arm 41a is rotated in the clockwise direction to move the latch 41 from the half-latched position to the fully latched position.

A ratchet arm 43a (see FIGS. 9, 10, and 14) integrally interlocked with the ratchet 43 is provided on a back side of the latch body 39. It is preferable that the ratchet arm 43a is pivotally supported by the ratchet shaft 42, and is coupled to the ratchet 43 by a coupling pin 44 so that the ratchet arm 43a integrally rotates with the ratchet 43. When the ratchet arm 43a is rotated by the motor power of a power releaser, which will be described below, the ratchet 43 is moved in a disengaging direction to unlatch the latch unit 37.

Releasing Mechanism of Operation Unit 38

Figure 10:
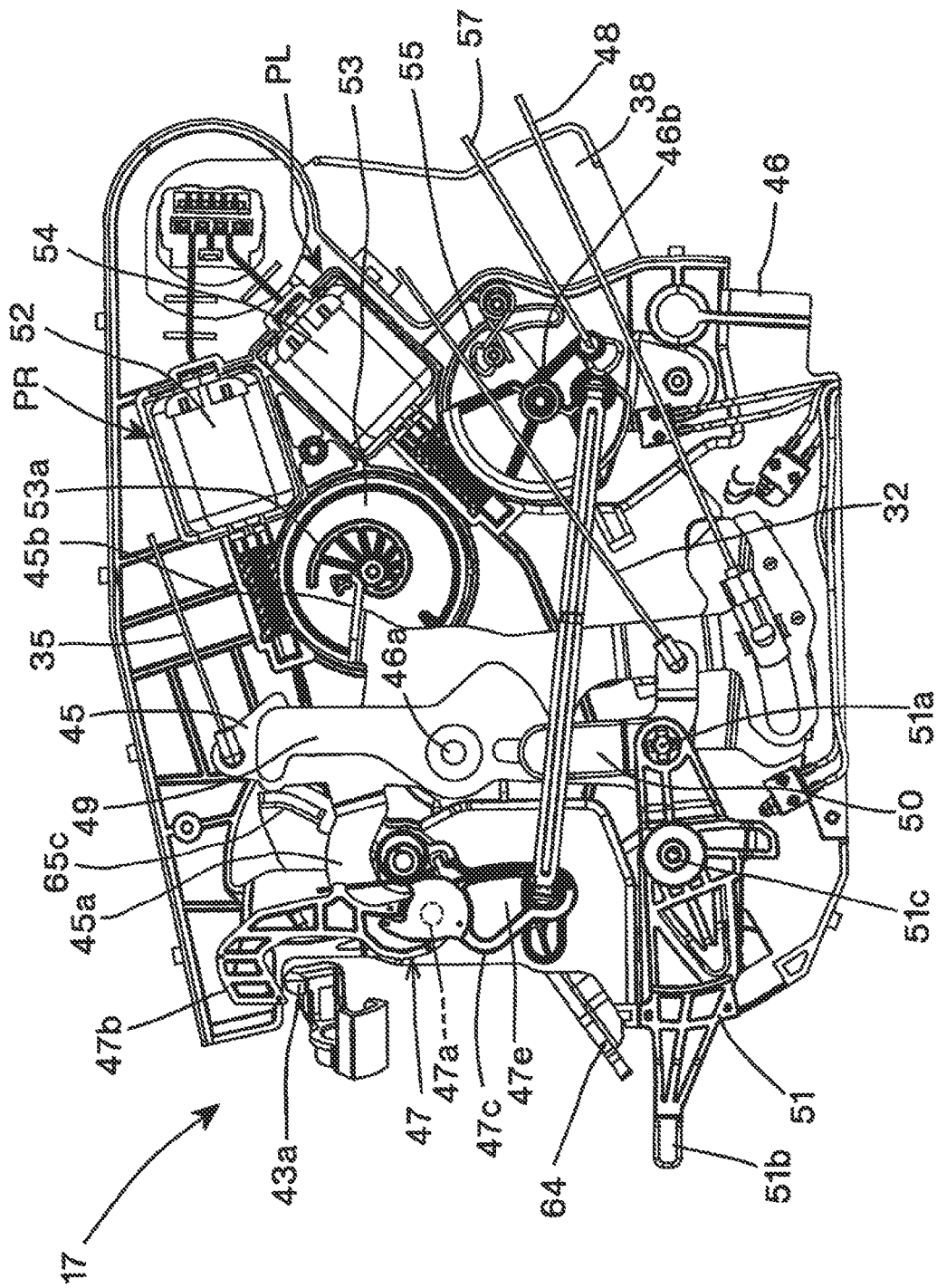
FIG. 10 is a side view illustrating an internal structure of the exterior side of the fully closed latch mechanism.
Figure 12:
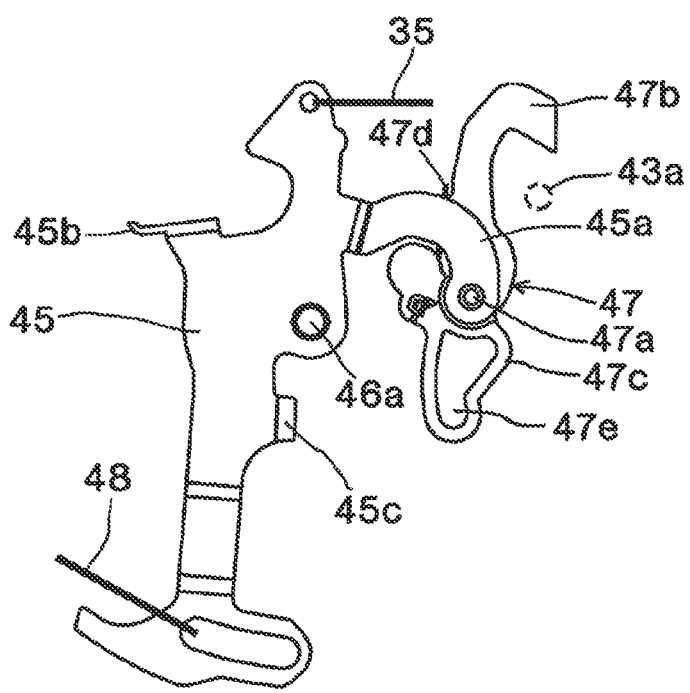
FIG. 12 is an interior side view illustrating a releasing mechanism of the fully closed latch mechanism.
Figure 13:
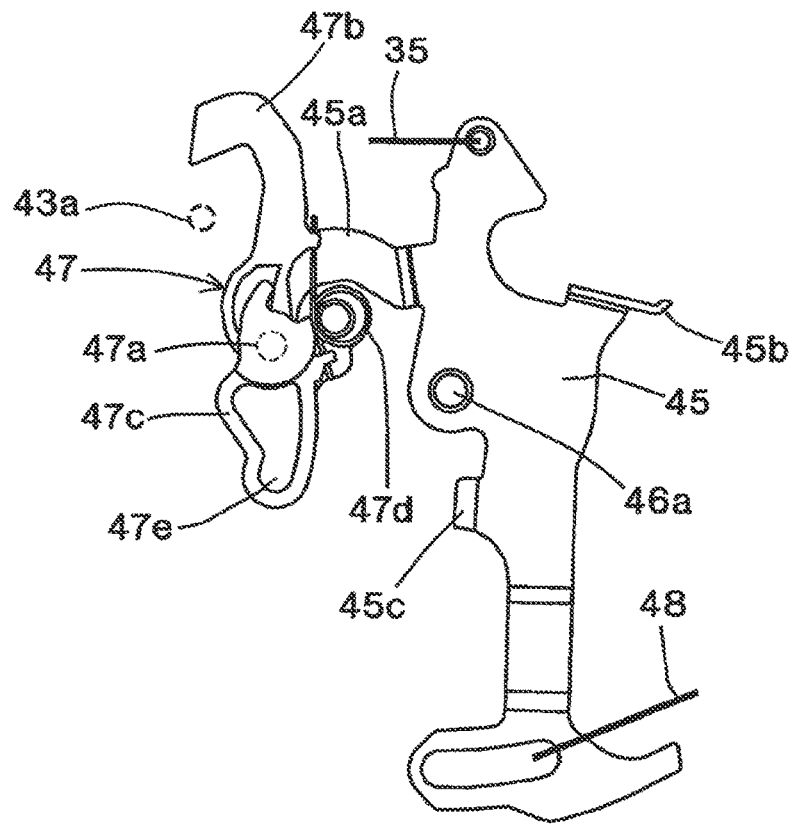
FIG. 13 is an exterior side view illustrating the releasing mechanism of the fully closed latch mechanism.

An internal structure of the operation unit 38 is illustrated in FIG. 9 and FIG. 10. An open lever extending in a vertical direction is provided in the center of the drawings, and the open lever 45 is pivotally supported by a shaft part 46a of a housing 46 of the operation unit 38. As illustrated in FIGS. 12 and 13, the open lever 45 includes a coupling arm 45a extending toward the rear, and an open link 47 is coupled to the tip end of the coupling arm 45a by a pin 47a.

Figure 14:
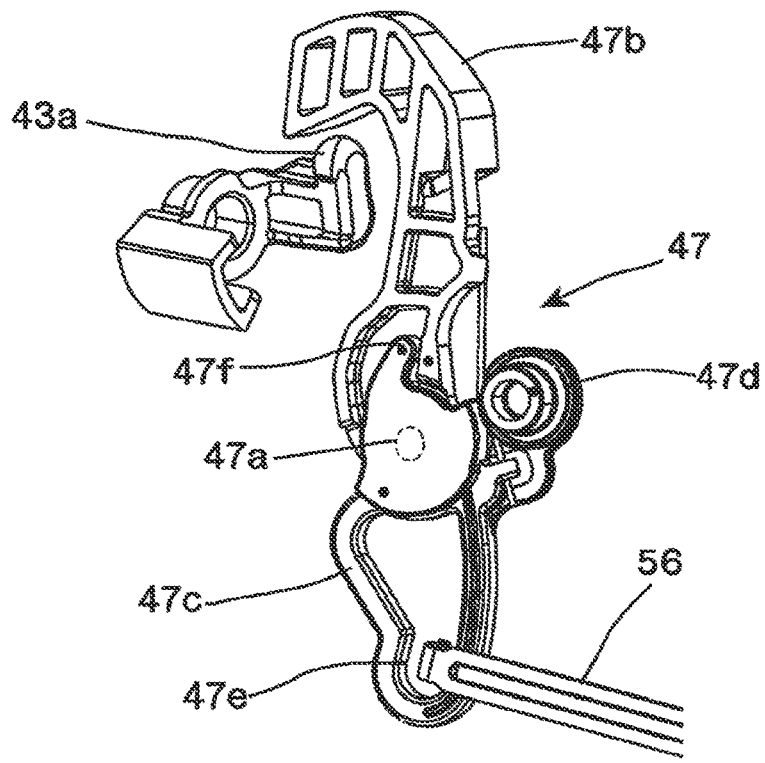
FIG. 14 is a perspective view of an open link and a ratchet lever.

The open link 47 is divided into a ratchet lever 47b in the upper part, and a lock interlocking lever 47c in the lower part. The ratchet lever 47b is pivotally supported by the pin 47a formed on the lock interlocking lever 47c. Moreover, the ratchet lever 47b and the lock interlocking lever 47c are elastically coupled by a coupling spring 47d, and in general, are integrally rotated as the open link 47. As illustrated in FIGS. 13 and 14, the tip end of the ratchet lever 47b faces the ratchet arm 43a in an engageable manner. When the tip end of the ratchet lever 47b is facing the ratchet arm 43a in an engageable manner, the lock mechanism will be in an unlocked state.

In FIGS. 10 and 13, when the open lever 45 is rotated in the counterclockwise direction (door opening direction) around the shaft part 46a, the open link 47 coupled by the pin 47a moves downward. When the open link 47 moves downward, the ratchet lever 47b of the open link 47 is brought into contact with the ratchet arm 43a to rotate the ratchet arm 43a downward. Consequently, the ratchet 43 is moved in the disengaging direction to be away from the latch 41, and the latch unit 37 will be unlatched.

The rotation of the open lever 45 in the door opening direction is performed by operating the outer handle OH coupled to the lower part of the open lever 45 via a cable 48.

Moreover, the upper part of the open lever 45 is coupled to the outer relay lever 34 of the relay control mechanism 20 via the cable 35. Consequently, when the open lever 45 is rotated in the door opening direction by the operation of the outer handle OH, as described above, the latch unit 37 will be unlatched. Furthermore, the outer relay lever 34 of the relay control mechanism 20 is also rotated to rotate the fully opened releasing lever 28 via the fully opened relay lever 33. Thus, the fully opened latch mechanism 18 will be also unlatched.

An inner lever 49 disposed so as to overlap with the open lever 45 is pivotally supported by the shaft part 46a of the housing 46. The lower part of the inner lever 49 is coupled to the inner relay lever 29 via the cable 32. When the door opening operation is performed on the inner handle IH, the inner lever 49 is rotated counterclockwise in FIG. 15.

Child Lock Mechanism

A slot 49a is provided in the inner lever 49, and a child pin 50a of a child link 50 is inserted into the slot 49a. When the inner lever 49 is rotated in the counterclockwise direction (FIG. 15), the child pin 50a moves to bring into contact with an engagement part 45c of the open lever 45 (FIGS. 12 and 13) to rotate the open lever 45 in the door opening direction. Consequently, the open link 47 is moved downward to unlatch the latch unit 37.

The child link 50 is coupled to a child lever 51 by a pin 51a. An operation knob 51b at the tip end of the child lever 51 is exposed to the outside of the sliding door 12 from the vicinity of the latch unit 37. In other words, because the operation knob 51b is exposed from the rear end surface of the sliding door 12, it is possible to effectively prevent the operation knob 51b from being operated improperly.

Figure 15:
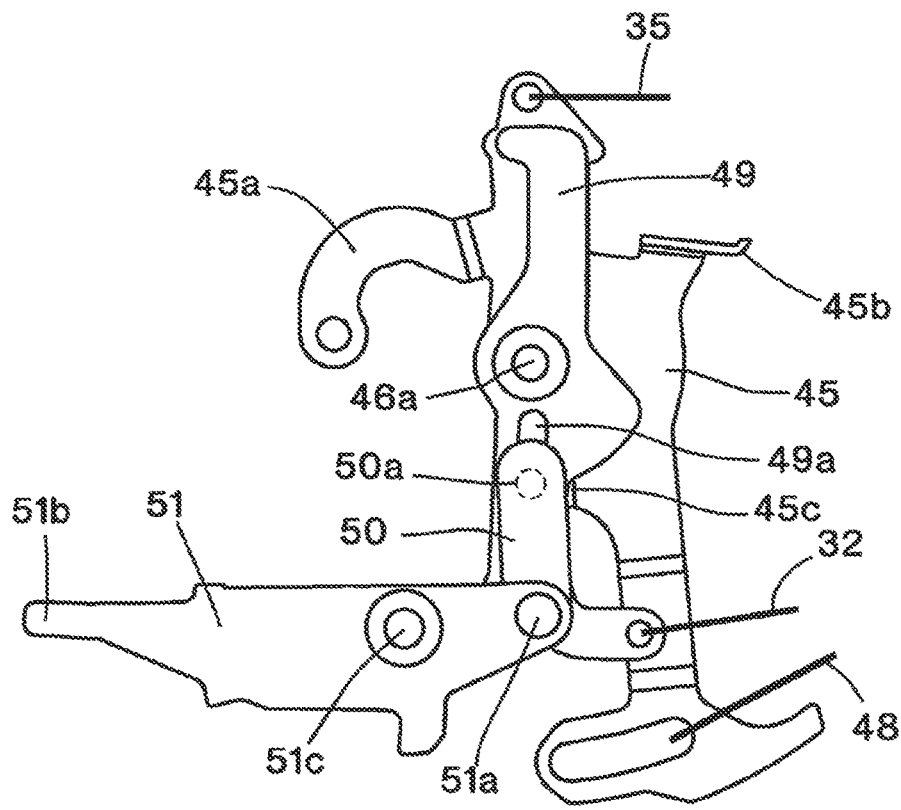
FIG. 15 is an exterior side view of the releasing mechanism of the fully closed latch mechanism and a child lock mechanism.
Figure 16:
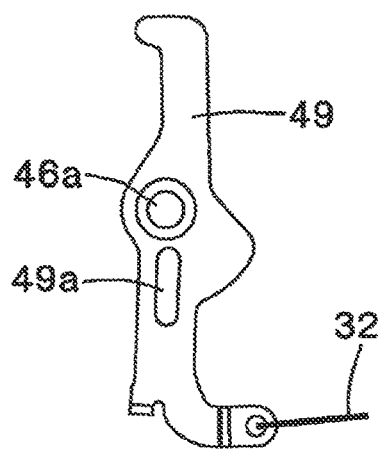
FIG. 16 is a side view of an inner lever.
Figure 17:
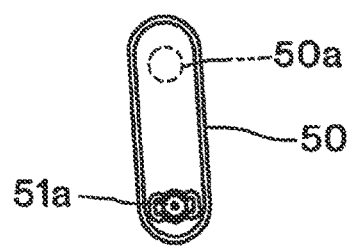
FIG. 17 is a side view of a child link.

When the operation knob 51b is operated toward the child lock side, the child lever 51 is rotated in the counterclockwise direction around a child shaft 51c in FIG. 15. Consequently, the child pin 50a is moved upward in the slot 49a. Thus, the child pin 50a does not face the engagement part 45c (the child pin 50a is in a child lock state), and the open lever 45 cannot be rotated in the door opening direction when the inner lever 49 is rotated in the door opening direction.

Power Releaser PR

The rotation of the open lever 45 in the door opening direction is also performed by a power releaser PR of the operation unit 38. The control of the power releaser PR will only be described briefly because it is not an object of the present application. The power releaser PR controls the unlatching of the latch mechanisms 17 and 18 by a touch sensor provided on the interior or exterior of the sliding door 12, a signal from a remote controller carried by a vehicle user and the like, or a signal from the switch 15a or 15b.

The power releaser PR includes a motor 52 installed inside the housing 46, and a cam body 53 is rotated by the power of the motor 52. In a standby state in FIG. 10, a cam surface 53a of the cam body 53 is not pressing a driven piece 45b of the open lever 45. When the motor 52 is rotated to rotate the cam body 53 in the clockwise direction, the driven piece 15b is pressed by the cam surface 53a, and the open lever 45 is rotated in the counterclockwise direction (door opening direction) around the shaft part 46a. Consequently, as described above, the latch unit 37 is unlatched, and the fully opened latch mechanism 18 is also unlatched.

In the present embodiment, the outer handle OH is coupled to the open lever 45 via the cable 48. However, when the outer handle OH is a grip that includes an electrical switch such as a touch sensor and that does not rotate, the cable 48 is omitted, and the power releaser PR is operated by the electrical switch. In this case also, the rotation of the open lever 45 is transmitted to the relay control mechanism 20 via the cable 35. Consequently, it is possible to easily change from the mechanical coupling to the electrical coupling.

The power release mechanism in the present embodiment is a mechanism for rotating the open lever 45 by the power of the power releaser PR.

Lock Mechanism and Power Lock Actuator PL

A power lock actuator PL includes a motor 54 installed inside the housing 46, and a disc-shaped lock member 55 is rotated by the power of the motor 54. The lock member 55 is pivotally supported by a shaft part 46*b* of the housing 46. The lock member 55 may also be a lever member as in a conventional example.

The front end of a coupling link 56 extending in the longitudinal direction is coupled to the lock member 55, and the rear end of the coupling link 56 is coupled to a coupling hole 47*e* of the lock interlocking lever 47*c* at the lower part of the open link 47.

The details of controlling the power lock actuator PL will be omitted because it is not an object of the present application. In FIG. 10, when the lock member 55 is rotated in the clockwise direction by the rotation of the motor 54 of the power lock actuator Pt, the lock interlocking lever 47*c* is rotated in the clockwise direction around the pin 47*a* via the coupling link 56 and a projection 44*f* of the lock interlocking lever 47*c* rotates the ratchet lever 47*b* in the clockwise direction against the elastic force of the coupling spring 47*d*. Consequently, the ratchet lever 47*b* is separated to the side of the ratchet arm 43*a*, and the ratchet lever 47*b* is no longer facing the ratchet arm 43*a*. Thus, the lock mechanism will be in a locked state.

In the locked state, even when the open lever 45 is rotated in the counterclockwise direction (door opening direction) around the shaft part 46*a* in FIGS. 10 and 13, the ratchet lever 47*b* will not be brought into contact with the ratchet arm 43*a*. Consequently, the latch unit 37 will not be unlatched.

A lock operation part 58 provided on the relay control mechanism is coupled to the lock member 55 via a cable 57 (FIG. 10). When the lock operation part 58 is operated, the open link 47 is switched between a lock position and an unlock position, via the lock member 55 and the coupling link 56. It is preferable to provide the lock operation part 58 in the vicinity of the inner handle IH so that the lock operation part 58 is exposed to the interior and the occupant can operate the lock operation part 58.

The lock mechanism is a mechanism for swinging the open link 47 around the pin 47*a*, and the open link 47 moves between the lock position and the unlock position by the power lock actuator PL and the lock operation part 58.

Power Closer PC

Figure 18:
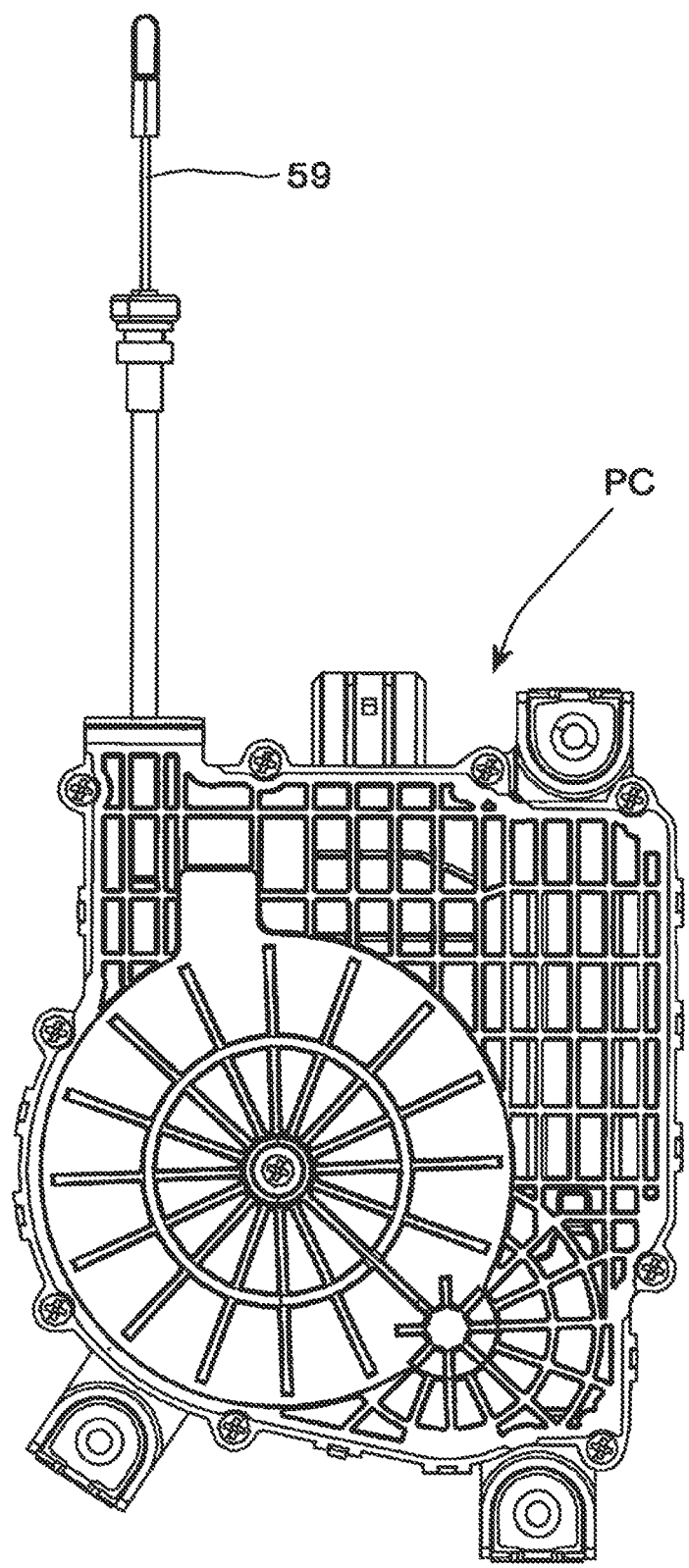
FIG. 18 is a side view of a power closer in the opening and closing device of the vehicle sliding door.

FIG. 18 indicates a power closer PC. The power closer PC winds and unwinds a cable 59 by the motor power. The power closer PC is disposed in the vicinity below the fully closed latch mechanism 17.

Figure 19:
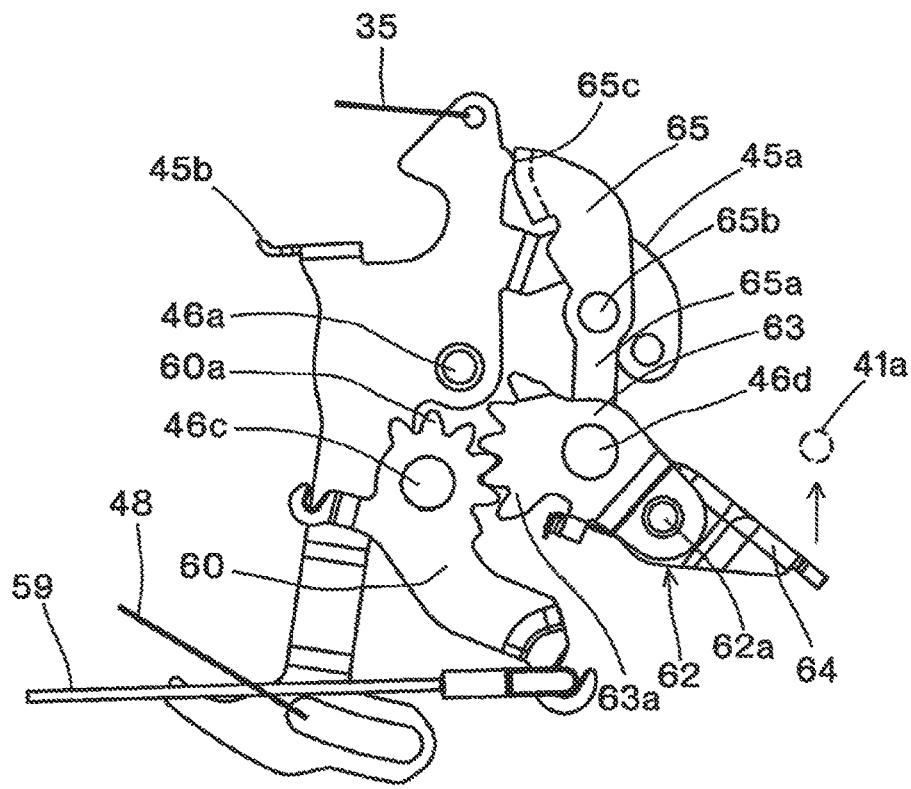
FIG. 19 is an interior side view illustrating a power transmission mechanism from the power closer to the latch.
Figure 20:
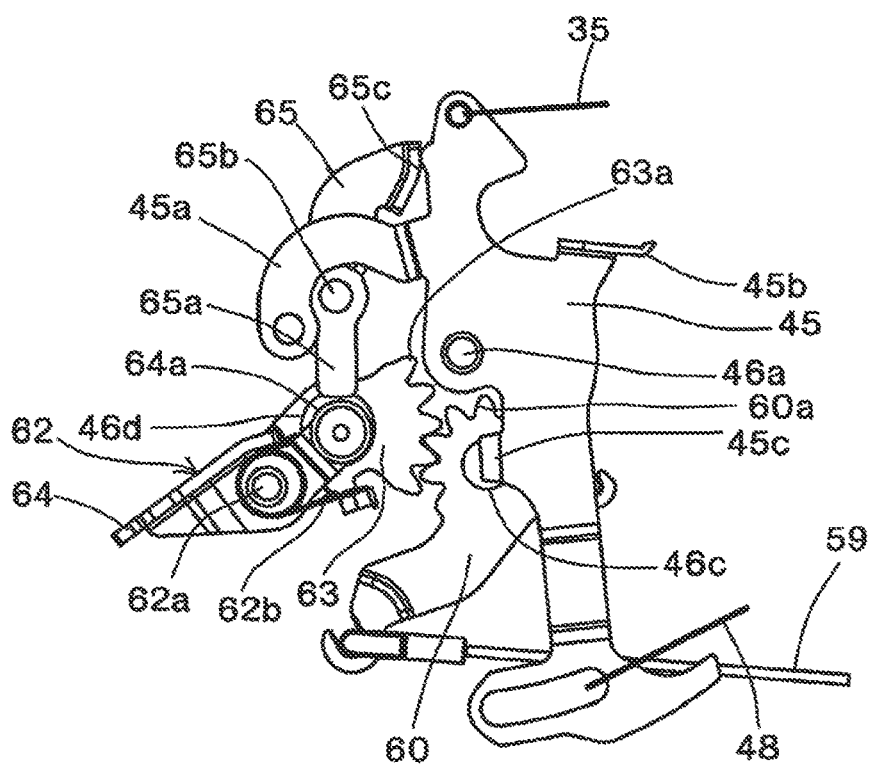
FIG. 20 is an exterior side view illustrating a power transmission mechanism from the power closer to the latch.

The tip end part of the cable 59 is coupled to a rotating end of a driving lever 60 illustrated in FIGS. 9, 19, and 20. The driving lever 60 is pivotally supported by a large-diameter shaft part 46*c* of the housing 46. When the power closer PC winds the cable 59, the driving lever 60 is rotated in the clockwise direction in FIGS. 9 and 19 against the elastic force of a spring 61.

An arc-shaped output gear 60*a* that rotates around the shaft part 46*c* is provided on the base part of the driving lever 60. A closing lever 62 is provided in the vicinity of the driving lever 60. The closing lever 62 is pivotally supported by a large-diameter shaft part 46*d* of the housing 46.

The closing lever 62 includes a driven lever 63 and a latch contacting lever 64. The driven lever 63 includes a driven gear 63*a* meshed with the output gear 60*a*, and is pivotally supported by the shaft part 46*d*. The latch contacting lever 64 is pivotally supported by a coupling shaft 62*a* on the driven lever 63, and is energized in the counterclockwise rotation direction by a spring 62*b* in FIG. 20 with respect to the driven lever 63.

A roller-shaped contacting part 64*a* is provided on the base end side of the latch contacting lever 64. The contacting part 64*a* is brought into contact with a supporting part 65*a* of a cancel lever 65 by the elastic force of the spring 62*b*, and the contacting part 64*a* is overlapped with the shaft part 46*d* in the width direction of the door.

When the driving lever 60 is rotated in the clockwise direction in FIG. 19 via the cable 59 by the motor power of the power closer PC, the driven lever 63 of the closing lever 62 is rotated in the counterclockwise direction (closing rotation) around the shaft part 46*d* via a gear engagement. At this point, the latch contacting lever 64 pivotally supported by the coupling shaft 62*a* on the driven lever 63 is rotated in the clockwise direction in FIG. 20 together with the driven lever 63 because the contacting part 64*a* at the base end side is restricted from upward movement when the contacting part 64*a* is brought into contact with the supporting part 65*a* of the cancel lever 65.

The tip end part of the latch contacting lever 64 is placed below the latch arm 41*a* of the latch 41 at the unlatched position (door opening position). When the latch contacting lever 64 moves upward in FIG. 20, the latch 41 is rotated from the unlatched position to the fully latched position. Consequently, the latch 41 is fully latched by the motor power of the power closer PC. In the exemplary product, the latch contacting lever 64 rotates the latch 41 at the half-latched position to the fully latched position (overstroke position).

The power closing mechanism is a mechanism for moving the latch 41 from the half-latched position to the fully latched position by the motor power of the power closer PC, and completing the closure of the sliding door 12 by the power.

Cancelation of Power Closer

As illustrated in FIGS. 9, 19, and 20, the cancel lever 65 extends in the vertical direction, and is disposed beside the open lever 45. The middle portion of the cancel lever 65 in the vertical direction is pivotally supported by a cancel shaft 65*b* in the housing 46. The supporting part 65*a* facing the contacting part 64*a* of the closing lever 62 (latch contacting lever 64) from above is provided on the lower part of the cancel lever 65, and a contacting part 65*c* is formed on the upper part of the cancel lever 65.

When the door opening operation of the open lever 45 or the inner lever 49 is performed, the cancel lever 65 is rotated in a cancel direction (the clockwise direction in FIGS. 9 and 19, and the counterclockwise direction in FIGS. 10 and 20). When the cancel lever 65 is rotated in the cancel direction, the supporting part 65*a* is no longer facing the contacting part 64*a* of the closing lever 62 (latch contacting lever 64). Consequently, the coupling rotation of the driven lever 63 and the latch contacting lever 64 is released, and the rotation of the latch 41 in the closing direction by the motor power will be cancelled.

Thus, it is possible to quickly release the rotation of the latch 41 by the motor power when the open lever 45 is rotated by the outer handle OH, or when the inner lever 49 is rotated via the inner relay lever 29 and the cable 32 by performing the door opening operation on the inner handle IH.

The cancel mechanism is a mechanism for quickly releasing the rotation of the latch 41 by the motor power by blocking the power transmission path (driving lever 60, closing lever 62, and the like) that transmits the motor power of the power closer PC to the latch 41.

In FIG. 1, an auxiliary power supply 66 for operating the power releaser PR of the fully closed latch mechanism 17 is provided inside the sliding door 12. The auxiliary power supply 66 enables to use the power releaser PR (to be switched to the unlatched state) in emergency, and is a multiple power supply used when the power supply circuit from the main battery of the vehicle to the fully closed latch mechanism 17 is damaged by a vehicle accident and the like. The auxiliary power supply 66 is also used as a backup power supply of the power lock actuator Pt.

Reduction in Weight

With the embodiment described above, it is possible to reduce the weight of the motor and cable of the opening and closing device of the vehicle sliding door.

The mechanisms conventionally provided on the relay control mechanism have been arranged in the fully closed latch mechanism and have been integrated into the fully closed latch mechanism. Consequently, it is possible to rationally arrange the cable and reduce the weight.

More specifically, the lock mechanism is moved from the relay control mechanism 20 to the fully closed latch mechanism 17, and the cable that pass through the lock mechanism is no longer required. Consequently, it is possible to successfully reduce the weight.

Moreover, the power supply such as a motor is moved from the relay control mechanism 20 to the fully closed latch mechanism 17. Thus, only the outbound cable from the power supply to the relay control mechanism 20 is required, and the inbound cable from the relay control mechanism 20 to the power supply side is no longer required. Consequently, it is possible to successfully reduce the weight.

Furthermore, the various mechanisms have been integrated to the fully closed latch mechanism 17, and the relay control mechanism 20 can be designed more rationally. Consequently, it is possible to easily assemble the relay control mechanism 20, and obtain a simple and a light-weight relay control mechanism 20.

In the present embodiment, the fully closed latch mechanism 17 that maintains the sliding door 12 in a closed state is provided on the rear side of the sliding door 12. However, instead of using the fully closed latch mechanism 17, it is also possible to install a front fully closed latch mechanism on the front side of the sliding door 12. The front fully closed latch mechanism may have a simple configuration including a basic latch/ratchet mechanism. Similar to the above, in this configuration also, it is possible to rationally arrange the cable, by integrating the mechanisms provided on the relay control mechanism into the front fully closed latch mechanism.

According to the disclosure, the lock mechanism, the power releaser PR, and the cancel mechanism are integrated into the fully closed latch mechanism 17. The relay control mechanism includes the handle lever 27. The handle lever 27 rotates in the door opening direction to unlatch the fully closed latch mechanism 17 and activate the cancel mechanism, when the door opening operation is performed on the inner handle IH. The handle lever 27 rotates in the door closing direction to unlatch the fully opened latch mechanism 18, when the door closing operation is performed on the inner handle IH. The handle lever 27 is pivotally supported by the handle case 22. Consequently, it is possible to more rationally design the relay control mechanism 20, and more easily assemble the relay control mechanism 20. Thus, it is possible to obtain a simple and light-weight relay control mechanism 20. Moreover, it is possible to rationally arrange the cable that mechanically couples the fully closed latch mechanism 17 and the relay control mechanism 20. Consequently, it is possible to significantly reduce the total of the weight of the cable and the weight of the motor of the power closer PC, the lock mechanism, and the power releaser PR than that of the conventional examples.

According to the disclosure, the relay control mechanism 20 does not require a movable member to which the motor power is directly transmitted. Consequently, it is possible to rationally design and easily assemble the relay control mechanism 20, and obtain a simple and light-weight relay control mechanism 20.

According to the disclosure, the auxiliary power supply 66 for operating the power releaser PR of the fully closed latch mechanism 17 is provided. Consequently, it is possible to secure a multiple power supply used when the power supply circuit from the main battery of the vehicle to the fully closed latch mechanism 17 is damaged by a vehicle accident and the like.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An opening and closing device of a vehicle sliding door, comprising:
    a first latch mechanism configured to maintain a sliding door in a closed state in cooperation with a first striker;
    a second latch mechanism configured to maintain the sliding door in an opened state in cooperation with a second striker, the second latch mechanism differing from the first latch mechanism;
    a power releaser configured to unlatch the first latch mechanism and the second latch mechanism by a first motor power;
    a power closer configured to move a first latch of the first latch mechanism from a half-latched position to a fully latched position via a closing lever configured to transmit a second motor power to the first latch, the power closer being functionally different from the power releaser configured to unlatch the first latch mechanism and the second latch mechanism by the first motor power;
    a cancel lever configured to cancel movement of the first latch toward the fully latched position by the second motor power, by blocking transmission of the second motor power from the closing lever to the first latch;
    a lock mechanism configured to switch between an unlocked state and a locked state by a third motor power, the unlocked state being a state which allows unlatching of the first latch mechanism by operating the power releaser, the locked state being a state which does not allow unlatching of the first latch mechanism by operating the power releaser; and a relay control mechanism that includes an inner handle, wherein the lock mechanism, the power releaser, and the cancel lever are disposed in the first latch mechanism, the relay control mechanism includes a handle lever configured to be coupled to the inner handle and to:

when a door opening operation is performed on the inner handle, rotate in a first direction to unlatch the first latch mechanism and activate the cancel lever, and when a door closing operation is performed on the inner handle, rotate in a second direction to unlatch the second latch mechanism, the inner handle is pivotally supported by a handle case of the relay control mechanism so as to be rotatable in two directions, and the handle lever is pivotally supported by the handle case;

the relay control mechanism further includes a base panel that is fixed to an inner panel of the sliding door, the handle case is fixed to the base panel, a fully opened releasing lever and an inner relay lever are pivotally supported by the base panel, the fully opened releasing lever is configured to rotate to unlatch the second latch mechanism when the handle lever is rotated in the second direction, and the inner relay lever is configured to rotate to unlatch the first latch mechanism when the handle lever is rotated in the first direction.

2. The opening and closing device of the vehicle sliding door according to claim 1, wherein:

an open lever that is connected to an outer handle and that is operated when the outer handle is operated is provided on the first latch mechanism, and the relay control mechanism further includes:

an outer relay lever coupled to the open lever via a cable; and a fully opened relay lever configured to rotate the fully opened releasing lever when the outer relay lever is operated depending on an operation of the open lever.

3. The opening and closing device of the vehicle sliding door according to claim 2, further comprising:

an auxiliary power supply configured to operate the power releaser provided inside the sliding door.

4. The opening and closing device of the vehicle sliding door according to claim 1, wherein the relay control mechanism includes:

the handle case, the inner handle that is pivotally supported on the handle case so as to be rotatable in the two directions, the two directions including a door opening operation direction and a door closing operation direction, the inner handle being configured to be operated from an inside of a vehicle, and the handle lever that is connected to the inner handle so as to be rotated when the inner handle is operated.

5. The opening and closing device of the vehicle sliding door according to claim 4, wherein the relay control mechanism further includes:

the fully opened releasing lever configured to engage with the handle lever, and the inner relay lever configured to engage with the handle lever.

6. The opening and closing device of the vehicle sliding door according to claim 5, wherein:

the handle lever is rotatable around a first pin, the fully opened releasing lever and the inner relay lever are rotatable around a second pin having an axis that is in parallel with an axis of the first pin, the fully opened releasing lever includes a first engagement piece that faces an end of the handle lever in an engageable manner, the inner relay lever includes a second engagement piece that faces the end of the handle lever in an engageable manner, and the first engagement piece and the second engagement piece are energized by a spring with the end of the handle lever interposed between the first engagement piece and the second engagement piece.

7. The opening and closing device of the vehicle sliding door according to claim 1, where the handle case is coupled to the base panel to form an integrated assembly with the base panel.

* * * * *